March 19, 1946.  C. G. LEONARD  2,397,021
NUT HULLER
Filed July 5, 1944  2 Sheets-Sheet 2
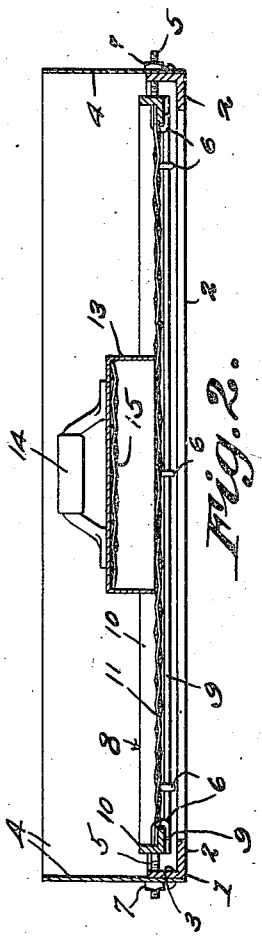
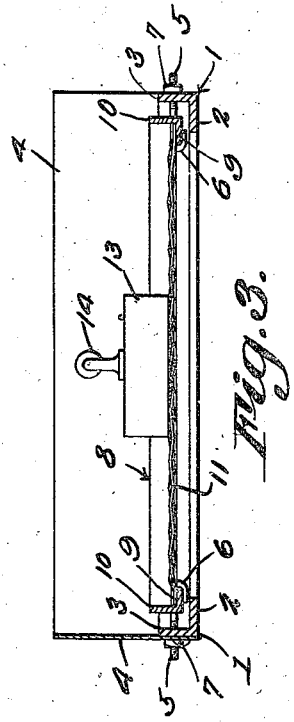
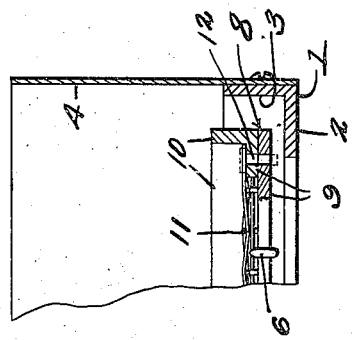
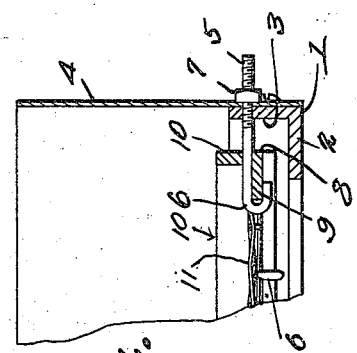
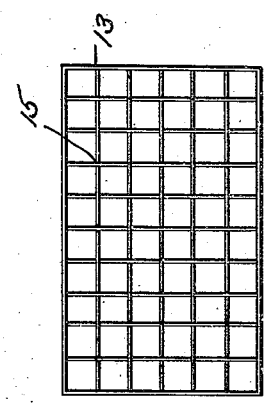
C. G. Leonard
INVENTOR.
BY
ATTORNEYS.

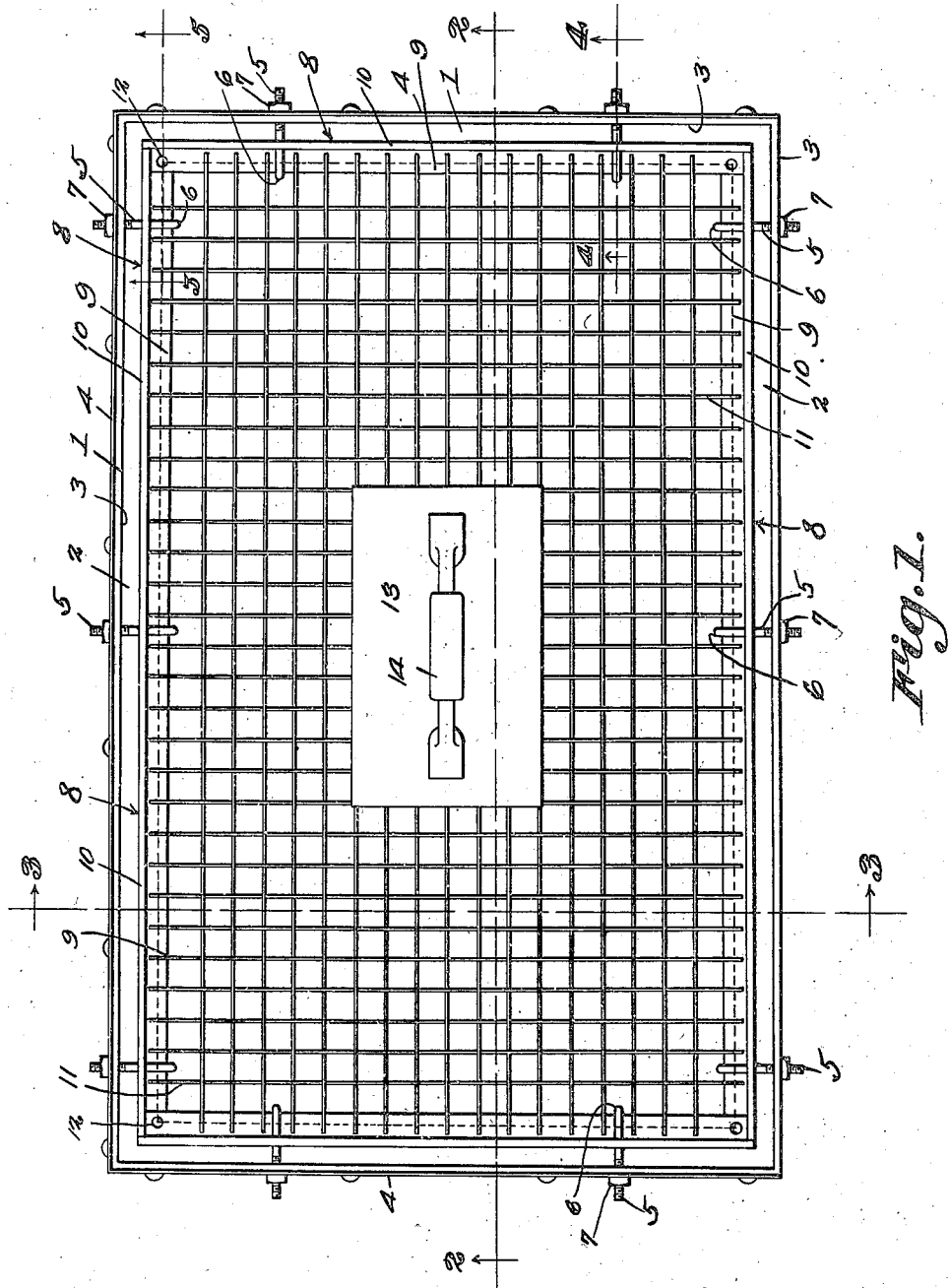

Patented Mar. 19, 1946

2,397,021

UNITED STATES PATENT OFFICE 2,397,021

NUT HULLER

Chester Guy Leonard, Pomona, Calif.; A. L. Hickson administrator of said Chester Guy Leonard, deceased Application July 5, 1944, Serial No. 543,544

2 Claims. (Cl. 130—30)

This invention relates to apparatus designed primarily for hulling walnuts although it could be used efficiently for hulling other nuts having thin shells.

An object of the invention is to provide a simple and compact structure on which the walnuts can be placed after which they can be shifted under pressure over a foraminous surface which cooperates with the shifting means to break the husks and separate them from the hulled nuts.

A further object is to provide a structure of this character which does not require any intricate mechanism and can be operated readily.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a top plan view of the complete apparatus.

Figure 2 is a section on a reduced scale taken on the line 2—2, Fig. 1.

Figure 3 is a section on a reduced scale taken on the line 3—3, Fig. 1.

Figure 4 is an enlarged section on the line 4—4, Fig. 1.

Figure 5 is an enlarged section on line 5—5, Fig. 1.

Figure 6 is a bottom plan view of the movable member of the huller.

Referring to the figures by characters of reference, 1 designates a main frame which can be of any desired proportions and is formed of angle metal arranged with base flanges 2 extending inwardly and outer flanges 3 extending upwardly. Guard plates 4 are secured to the outer sides of the flanges 3 at the back and sides of the frame and serve to prevent the nuts from falling off of the huller at those points.

Mounted in the upstanding flanges 3 of the main frame 1 at desired intervals are bolts 5 having hooks 6 at their inner ends. Adjusting nuts 7 are mounted on these bolts and bear against the outer surfaces of the structure.

The bolts 5 are extended through openings in the respective sides of the frame 8 of a screen constituting one of the hulling elements. This frame consists of strips of angle metal lapping at their ends and each having a base flange 9 extended inwardly and an outer side flange extending upwardly as at 10. The bolts are extended through the flanges 10 while to the flanges 9 are welded or otherwise joined the ends of heavy wires constituting a screen 11 of very coarse mesh. Openings 12 may be formed in the lapping portions of the frame members 8 so that they can be held together while the screen is being handled preparatory to being placed within the main or holding frame. Thereafter the securing means used, which can be bolts or pins, are removed following the application of the hooks 6 to the inner edges of the flanges 9 as shown. After the bolts have thus been placed in engagement with the members of the frame 8, they are tightened so as to draw the screen taut both longitudinally and transversely.

The screen 11 is of such strength as to resist the wear and tear to which it is subjected by nuts being rolled thereover and the mesh is sufficient to permit the pieces of husk to fall through the screen during the hulling operation.

There is used in connection with screen 11 a movable hulling member in the form of an inverted box-like structure 13 having a handle 14 secured to the top thereof. This member, which is open at the bottom, has a lining 15 and the structure is so proportioned that when a layer of nuts to be hulled is placed in the member, they will be gripped between the lining 15 and the screen above which the movable member is located.

In practice the inverted member 13 is filled with the nuts to be hulled after which the member 13 is pressed downwardly on the nuts, forcing them against the screen 11. The nuts thus pressed and held are moved in different directions over the screen 11 and the abrasive action will be such as to cause the shells to break up and fall through screen 11.

It has been found in practice that the structure herein described constitutes a means for quickly and efficiently hulling walnuts and as it can be quickly set up and can be used readily, it has been found very advantageous, particularly in view of the fact that no mechanism is required.

What is claimed is:

1. The combination with a rigid main frame comprising connected angle strips, and an upwardly extended guard along three sides of the frame and fixedly joined thereto, of a replaceable structure supported within and out of contact with the main frame, said structure including a screen, angle strips at the sides and ends of the screen, each of said angle strips having a bottom flange extended inwardly under the adjoining portion of the screen, said screen being fixedly joined to the flanges thereunder, bolts removably seated in the sides and ends of the main frame and extended detachably within openings in the side and end strips of the screen, hooks on the bolts straddling the inwardly extended flanges to which the screen is joined, and means engaging the bolts and positioned outside of the main frame for shifting said bolts thereby to place the screen under tension both transversely and longitudinally and to support the screen and its angle strips within and spaced from the main frame.

2. The combination with a rigid main frame comprising connected angle strips, and an upwardly extended guard along three sides of the frame and fixedly joined thereto, of a replaceable structure supported within and out of contact with the main frame, said structure including a screen, angle strips at the sides and ends of the screen, each of said angle strips having a bottom flange extended inwardly under the adjoining portion of the screen, said screen being fixedly joined to the flanges thereunder, bolts removably seated in the sides and ends of the main frame and extended detachably within openings in the side and end strips of the screen, hooks on the bolts straddling the inwardly extended flanges to which the screen is joined, and means engaging the bolts and positioned outside of the main frame for shifting said bolts thereby to place the screen under tension both transversely and longitudinally and to support the screen and its angle strips within and spaced from the main frame, inverted means mounted movably on the screen for holding a plurality of nuts to be shelled, the depth of said nut holding means being less than the maximum diameter of a nut to be hulled, a handle carried by said means and a wire fabric within the nut holding means for engaging and bearing on a plurality of nuts within the holding means, said holding means being proportioned to move throughout the width and length of the tensioned screen.

CHESTER GUY LEONARD.